United States Patent [19]
Wagner et al.

[11] Patent Number: 5,716,134
[45] Date of Patent: Feb. 10, 1998

[54] DEVICE FOR DETECTING THE TEMPERATURE OF A GEARBOX

[75] Inventors: Gerhard Wagner, Remseck; Henrich Wied, Eckental-Forth, both of Germany

[73] Assignee: Mercedes Benz AG, Germany

[21] Appl. No.: 600,596

[22] Filed: Feb. 13, 1996

[30] Foreign Application Priority Data

Feb. 13, 1995 [DE] Germany ................ 195 04 650.1

[51] Int. Cl.⁶ .................... G01K 1/14; G01K 7/00; G01K 13/00
[52] U.S. Cl. .................... 374/141; 374/145; 374/163
[58] Field of Search .................... 374/141, 145, 374/163; 477/98, 99

[56] References Cited

U.S. PATENT DOCUMENTS

| | | | |
|---|---|---|---|
| 4,226,141 | 10/1980 | Espenschied | 477/98 |
| 4,733,581 | 3/1988 | Hasegawa et al. | |
| 4,825,372 | 4/1989 | Yasue et al. | 477/98 |
| 4,831,896 | 5/1989 | Sakakiyama | 477/98 |
| 5,020,007 | 5/1991 | Wu et al. | 374/145 |
| 5,076,708 | 12/1991 | Pierson | 374/144 |
| 5,131,293 | 7/1992 | Kaiser et al. | |
| 5,261,295 | 11/1993 | Iwanaga et al. | 477/98 |
| 5,319,963 | 6/1994 | Benford | 374/141 |
| 5,345,843 | 9/1994 | Fujita et al. | 477/98 |
| 5,416,728 | 5/1995 | Rudzewicz et al. | 374/144 |

FOREIGN PATENT DOCUMENTS 0 479 464  4/1992  European Pat. Off.
39 28 814  3/1991  Germany.

OTHER PUBLICATIONS

Patent Abstract of Japan for Japanese Patent Document No. 5-272662 dated Oct. 19, 1993.
Patent Abstract of Japan for Japanese Patent Document No. 2-42245 dated Feb. 13, 1990.
Patent Abstract of Japan for Japanese Patent Document No. 3-244868 dated Oct. 31, 1991.
Patent Abstract of Japan for Japanese Patent Document No. 3-260463 dated Nov. 20, 1991.
Patent Abstract of Japan for Japanese Patent Document No. 2-51659 dated Feb. 21, 1990.

*Primary Examiner*—Diego F. F. Gutierrez
*Attorney, Agent, or Firm*—Evenson, McKeown, Edwards & Lenahan, P.L.L.C.

[57] ABSTRACT

The invention provides an arrangement for detecting the temperature of an automatic gearbox which has a temperature sensor and a starter-interlock contact switch in the gearbox component and, externally with respect thereto, a gearbox control device to which signal information from the temperature sensor and from the starter-interlock contact switch can be fed via separate signal lines. The temperature sensor and the starter-interlock contact switch are connected to a common signal line which leads to the gearbox control device, specifically in a series or parallel circuit arrangement.

7 Claims, 2 Drawing Sheets

DEVICE FOR DETECTING THE TEMPERATURE OF A GEARBOX

BACKGROUND AND SUMMARY OF THE INVENTION

The invention relates to a device for detecting the temperature of a gearbox component in an automatic gearbox arrangement of the type having a temperature sensor, a starter-interlock contact switch in the gearbox component and a gearbox control device which has a signal connection to the latter. In such gearbox arrangements, the starter-interlock contact switch in the gearbox component usually informs the gearbox control device, via an associated signal line, whether the gearbox is in a parked setting (P) or an idling setting (N), permitting the engine to start only if it is.

German Patent Document DE OS 39 28 814 A1 discloses an arrangement having a temperature sensor at the gearbox to detect a cold-start condition, after which the gearbox speeds are shifted by a gearbox control, away from a consumption-optimized gearbox shift program which is otherwise effective. The temperature sensor is connected to the gearbox control device via a separate gearbox temperature signal line.

A further reason for detecting the temperature of the gearbox oil is that automatic gearboxes are usually shifted with shift elements in the form of clutches and brakes which are controlled by hydraulic valves. Thus, the actuation of such shift elements is highly temperature-dependent since the viscosity of the gearbox oil, which is also used as a hydraulic fluid, changes markedly with the temperature.

The temperature thus affects the level and the time behavior of the applied pressure. It is therefore desirable to be able to take into account the temperature of the gearbox oil when setting the pressure in order to be able to compensate for the different behavior of the pressure profile at different temperatures. This can be achieved, as is known, by the arrangement of a gearbox oil temperature sensor in the automatic gearbox, such as is described for example by K. Neuffer, "Elektronische Getriebesteuerung von Bosch" [Electronic gearbox control by Bosch], ATZ 94 (1992) 9, page 442. The arrangement of a gearbox temperature sensor is also shown in German Patent Document P 43 44 584.5-34. In these arrangements the temperature signal of the sensor is fed via a separate electrical line to an associated signal evaluation unit in the electronic gearbox control, and is processed there in such a way that the applied prespecified pressure compensates for the temperature behavior of the gearbox oil. Further arrangements of gearbox oil temperature sensors with a separate electrical temperature signal line leading to an associated signal evaluation unit are disclosed in the Laid-Open Japanese Patent Documents JP 2-51659 (A), JP 3-260463 (A), JP 3-244868 (A), and JP 2-42245 (A). The separate temperature signal line requires corresponding expenditure on cabling in each case.

As an alternative to the arrangement of a temperature sensor in the gearbox component, the gearbox temperature has also been determined indirectly via detection (provided primarily for the engine control) of the temperature of the cooling water of the engine. See, for example, T. Kondo, Toyota "ECT-i" A New Automatic Transmission with Intelligent Electronic Control System, SAE Publication 900550, International Congress, Detroit, Mich., 26.2.1990-2.3.1990. Separate cabling between the engine control and gearbox control can be dispensed with if a data bus is available for transmitting data from the engine control device to the gearbox control device. However, with this procedure there is the fundamental difficulty that the temperature of the cooling water of the engine does not always correlate precisely with the temperature of the gearbox. This is especially the case in the warming-up phase of the engine and gearbox and in the region of high operating temperatures in which the temperature of the cooling water is limited to values below 100° C. while the temperature of the gearbox oil can easily reach values of for example 130° C. or more.

An object of the present invention is to provide a device for detecting gearbox temperature of the type mentioned previously which can provide a comparatively reliable and precise determination of the pressure, with a low expenditure on cabling.

This and other objects and advantages are achieved by the temperature sensing arrangement according to the invention, in which the temperature sensor and the starter-interlock contact switch are connected to a common signal line which in turn is connected to the gearbox control device so that it is not necessary to provide separate cabling for the temperature sensor. Such an arrangement of the temperature sensor ensures the exact detection of the gearbox oil temperatures which actually occur, and thus takes into account the real conditions in the gearbox with a low expenditure in constructional and cost terms.

The connection of the gearbox oil temperature sensor and the starter-interlock contact switch to the same signal line is effected in such a way that the gearbox control unit can unambiguously distinguish the temperature signal from the switch position signal generated by the switching of the starter-interlock contact switch on or off. In an advantageous embodiment of the invention, the temperature sensor is connected in a common signal line in series with the starter-interlock contact switch. In the parked setting (P) and idling setting (N) of the gearbox selector lever, the switch is opened and the temperature signal is thus interrupted during these time periods. When a gear for travel mode is engaged, the switch is closed and the temperature signal is fed to the gearbox control device which reads both the instantaneous gearbox oil temperature and the fact that a travel mode gear has been engaged from this information.

In an alternative embodiment of the gearbox oil temperature sensor the latter is connected to the common signal line in parallel with the starter-interlock starter-interlock contact switch. When the gearbox is in the parked setting (P) or the idling setting (N), the contact switch is closed and the signal from the temperature sensor is suppressed. On the other hand, if a gear is engaged, the starter-interlock contact switch is in the opened position, and the signal from the gearbox oil temperature sensor is fed via the common signal line to the gearbox control device. The latter in turn can detect from the signal present whether a gear is engaged and, if so, how high the instantaneous gearbox oil temperature is.

In a further embodiment of the invention, a connection line is provided from an engine control device, which has information relating to the temperature of the cooling water of the engine, to the gearbox control device. The information on the temperature of the cooling water can then be fed to the gearbox control device and evaluated by the latter to determine the gearbox temperature during those time periods in which no gearbox oil temperature signal is transmitted on the common signal line from the gearbox temperature sensor and starter-interlock contact switch, due to the presence of the parked setting (P) or the idling setting (N) of the gearbox. Since it is unnecessary to initiate any pressure control actions of the gearbox in these gearbox settings, the precision of gearbox temperature detection in such time periods is less decisive. Thus, the indirect derivation of the gearbox oil temperature from the temperature of the engine cooling water is sufficient. On the other hand, when the selector lever is moved to a travel mode gear, the output signal of the gearbox oil temperature sensor is then immediately available for the direct, precise determination of the gearbox oil temperature.

The indirect determination of the gearbox oil temperature which is made available by this refinement by means of the temperature of the engine cooling water makes it additionally possible to maintain the travel mode with sufficient, though not optimum, travelling comfort, even if the signal from the gearbox oil temperature sensor is lost because of a sensor defect, contact problems, break in the cable or the like.

Other objects, advantages and novel features of the present invention will become apparent from the following detailed description of the invention when considered in conjunction with the accompanying drawings.

DETAILED DESCRIPTION OF THE DRAWINGS

Figure 1:
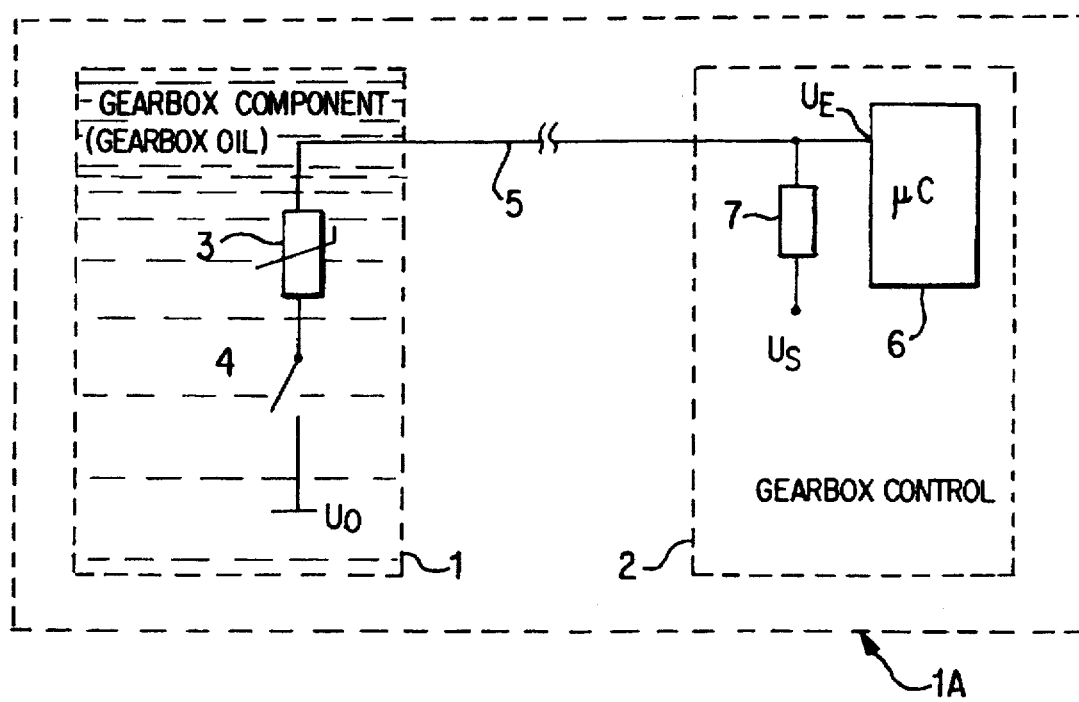
FIG. 1 is a schematic diagram of a device for detecting the gearbox temperature of an automatic gearbox arrangement with a gearbox oil temperature sensor connected to a common signal line in series with a starter-interlock contact switch.
Figure 2:
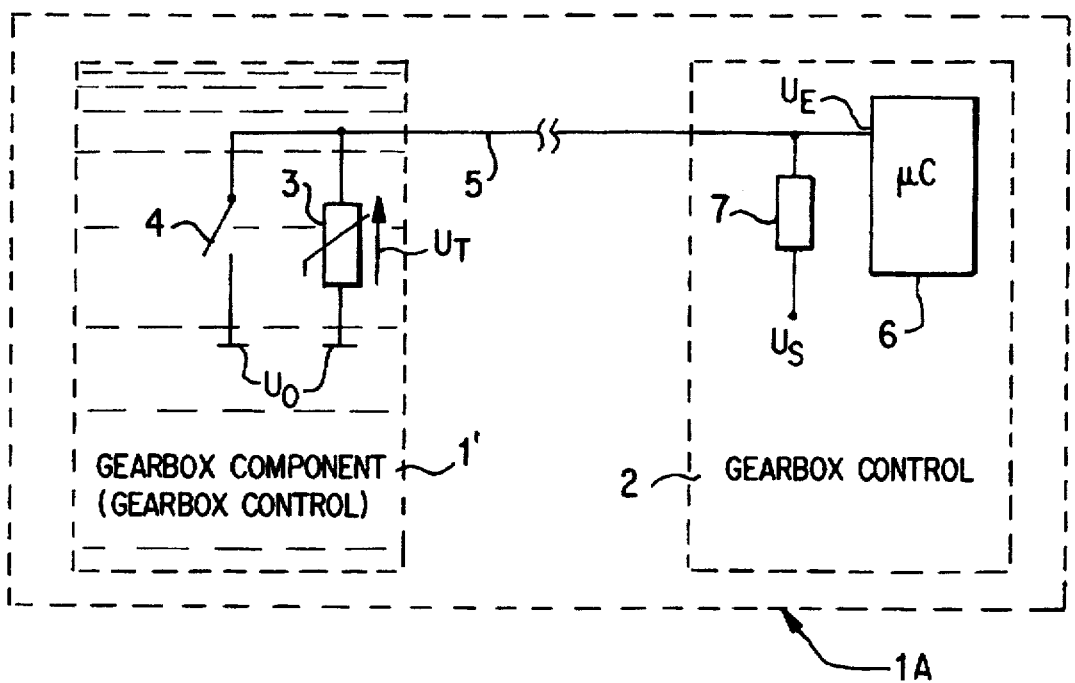
FIG. 2 is a schematic diagram of a device for detecting the gearbox temperature of an automatic gearbox arrangement with a gearbox oil temperature sensor connected to a common signal line in parallel with a starter-interlock contact switch.

In both FIGS. 1 and 2 an automatic gearbox arrangement is illustrated schematically, with only those components essential to explain the present invention. (Elements with identical functions in the two alternative arrangements have the same reference symbols.)

The automatic gearbox arrangement (1A) illustrated in FIG. 1 contains a gearbox component (1) and a gearbox control device (2) arranged externally with respect to the latter. The gearbox component (1) contains gearbox oil, as well as a series circuit comprising a gearbox oil temperature sensor (3) and a starter-interlock contact switch (4), which are connected at one end to ground potential ($U_O$) of 0 V inside the gearbox. A common signal line (5) leads from the other end of the series circuit out of the gearbox component (1) to the separate gearbox control device (2). To be more precise, the electrical signal line (5) which is common to the temperature sensor (3) and the starter-interlock contact switch (4) is connected to an input ($U_E$) Of a microcontroller (6) in the gearbox control device (2) which functions as a signal evaluation unit and carries out the control of the gearbox. This input ($U_E$) of the microcontroller (6) is also connected to a positive supply voltage ($U_S$) of 5 V via a resistor (7). In all other respects, the gearbox control device (2) and the gearbox component (1) are of a conventional design, which is well known to those skilled in the art and is of no further interest here. The gearbox component (1) can be for example of a design such as is described in the German Patent Document P 43 44 584.5-34 cited previously. The characteristic feature of the arrangement in FIG. 1 consists in the arrangement of the temperature sensor (3) and the starter-interlock contact switch (4) in series, between the ground voltage terminal ($U_O$) and the common signal line (5).

The microcontroller (6) can detect the setting of the starter-interlock contact switch (4) by means of the signal present at its input ($U_E$) assigned to the signal line (5). Moreover, when the starter-interlock contact switch is closed, the microcontroller (6) can detect the temperature measured by the gearbox oil temperature sensor (3), which is explained below with reference to FIG. 3.

Figure 3:
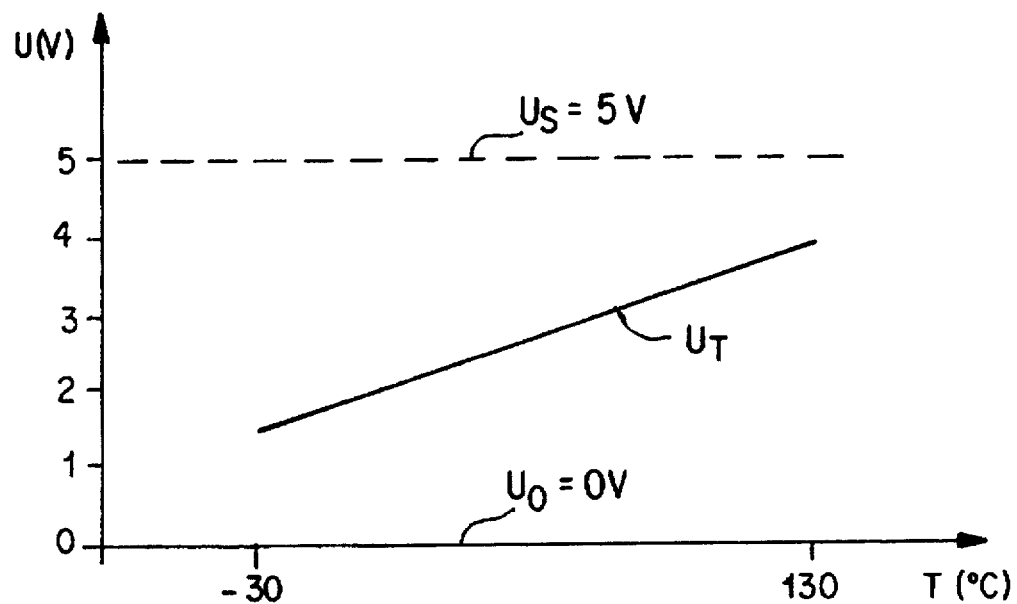
FIG. 3 is a graphic presentation of the voltage on the common signal line as a function of the gearbox oil temperature, which illustrates the method of operation of the devices in FIGS. 1 and 2.

If a travel mode gear is engaged by means of the gearbox selector lever, the starter-interlock contact switch (4) is kept in its closed setting. Thus, the voltage signal ($U_T$) supplied by the gearbox oil temperature sensor (3) is present on the common signal transmission line (5) during the travel mode. The characteristic curve of this voltage signal ($U_T$) as a function of the gearbox oil temperature is illustrated in FIG. 3. The voltage values ($U_T$) lie unambiguously between 1 V and 4 V, and the microcontroller (6) detects the instantaneous gearbox oil temperature by reference to the voltage value present on the signal line (5).

If, on the other hand, a travel mode gear is not engaged and the selector lever is in the parked setting (P) or idling setting (N), the starter-interlock contact switch (4) is moved into its opened switch position shown in FIG. 1. Thus, the signal of the gearbox oil temperature sensor (3) is no longer fed to the microcontroller (6). Rather, the high supply voltage potential ($U_S$) of 5 V is now present at the associated microcontroller input ($U_E$). Since this voltage value ($U_S$) differs clearly from those voltages ($U_T$) which are produced by the gearbox oil temperature sensor (3) when the starter interlock contact switch (4) is closed, as can be seen in FIG. 3, the microcontroller (6) detects this gearbox setting state unambiguously. It utilizes this information during the detection of the gearbox setting state especially to enable starting of the engine which it otherwise disables; that is, when a signal ($U_T$) from the temperature sensor (3) is present. In this way, the signal line (5) functions both as a measurement signal line for the gearbox oil temperature measurement signal and as a switch setting detection line for the starter-interlock contact switch (4). This arrangement thus provides a saving in terms of expenditure on cabling in comparison with a respective separate signal line for the temperature sensor (3) on the one hand and the starter-interlock contact switch (4) on the other.

Figure 4:
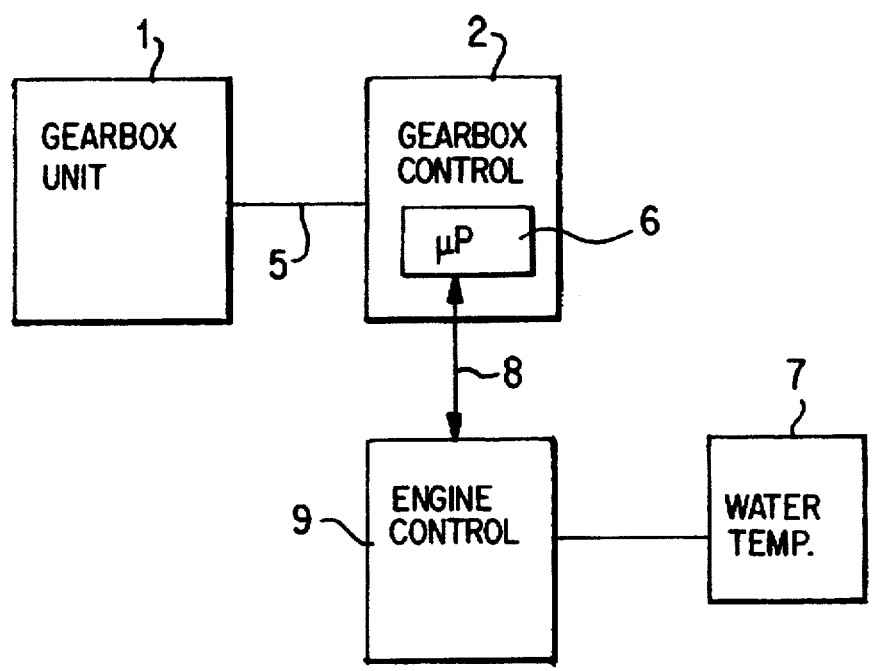
FIG. 4 is a schematic diagram of an embodiment of the invention which has an alternative arrangement for detecting gearbox temperature indirectly.

Although the arrangement in FIG. 1 does not directly detect the gearbox oil temperature by means of the gearbox oil temperature sensor (3) in the parked setting (P) or idling setting (N) of the automatic gearbox, this is less critical since in these gearbox settings no actions in the hydraulic pressure control of the gearbox are initiated. Thus, the information relating to the exact temperature of the gearbox oil is of less significance. Nevertheless, as shown in FIG. 4, in order to obtain a reasonably reliable estimate of the temperature of the gearbox oil, the signal from a sensor (7) for the temperature of the cooling water of the engine (which signal is fed to the associated engine control (9)) is also transmitted via a data bus (8) to the microcontroller (6) of the gearbox control device (2). The microcontroller (6) uses this cooling water temperature signal to determine the gearbox temperature indirectly, as a substitute for the operating states with interrupted gearbox oil temperature sensor signal.

If the vehicle is started cold, the engine and gearbox temperatures are equal. The gearbox control device (2) thus acquires the gearbox temperature indirectly from the information on the temperature of the cooling water from the engine control at the start and during the starting process. When the selector lever is transferred to a travel mode gear, the starter-interlock contact switch (4) is closed immediately, so that the exact gearbox oil temperature signal from the gearbox oil temperature sensor (3) is present in the gearbox control device (2) even before a gearbox control action (for example, the activation of a clutch or brake) is initiated. Thus, the instantaneous, exact gearbox oil temperature value is taken into account for these actions. If the driver places the gearbox selector lever in the idling setting (N) again, for example in the warming-up phase, the signal from the gearbox oil temperature sensor (3) is interrupted again and the gearbox control device (2) once again determines the gearbox temperature indirectly by means of the information relating to the temperature of the engine cooling water.

In addition, this manner of determining the temperature of the gearbox oil indirectly as a substitute when the signal from the gearbox oil temperature sensor (3) fails, for example because of a sensor defect, contact problems or a break in a cable on the associated signal line (5), permits the travel mode to be maintained using the indirect information on the temperature of the gearbox oil, admittedly no longer with an optimum travelling comfort in all travelling states but with sufficient travelling comfort.

The automatic gearbox arrangement illustrated in FIG. 2 is a variant of the arrangement in FIG. 1, in which the gearbox oil temperature sensor (3) of the gearbox component (1') is connected in a loop between the common signal line (5) and the ground voltage terminal ($U_O$) in parallel with the starter-interlock contact switch (4). This results in the following method of operation, again taking into account FIG. 3.

If the gearbox selector lever is in the parked (P) or idling (N) setting, the starter-interlock contact switch (4) is moved into its closed setting, so that the ground voltage potential ($U_O$) of 0 V is present at the associated input ($U_E$) Of the microcontroller (6) in the gearbox control device (2) via the common signal line (5). The signal from the gearbox oil temperature sensor (3) thus remains ineffective. Since, as is clear from FIG. 3, the voltage value of 0 V again differs unambiguously from the voltage values between 1 V and 4 V (produced by the gearbox oil temperature sensor (3) in the pertinent temperature range), the microcontroller (6) can detect this state of the closed starter-interlock contact switch (4) without difficulty, and enables starting of the engine.

If, on the other hand, a travel mode gear is engaged, the starter-interlock contact switch (4) is in the opened setting illustrated in FIG. 2, so that the signal of the gearbox oil temperature sensor (3) is now present at the associated input ($U_E$) Of the microcontroller (6) via the signal line (5). From the voltage value ($U_T$) of this signal which is in turn dependent on the temperature of the gearbox oil (as shown in FIG. 3), the microcontroller (6) detects whether a travel mode gearbox setting is present and detects the instantaneous temperature of the gearbox oil directly and precisely.

Otherwise the same functional properties are obtained for the arrangement in FIG. 2 as are described above in relation to the arrangement in FIG. 1. In particular, in the arrangement in FIG. 2, the temperature of the gearbox oil is determined indirectly based on the temperature of the engine cooling water. The latter information is fed to the gearbox control device (2) from an engine control device via a data bus. This alternative determination is activated whenever gearbox oil temperature sensor (3) is ineffective; i.e., in this case when the starter-interlock contact switch (4) is closed owing to a parked setting (P) or idling setting (N) of the gearbox.

Consequently, with the device according to the invention it is possible to eliminate the need for a separate connection between the gearbox oil temperature sensor in the gearbox component and the gearbox control device as well as for the associated control device connection contacts and corresponding input wiring without. Moreover, this arrangement does not adversely affect the functions which are dependent on the information relating to the temperature of the gearbox oil, since a precise, direct determination of the temperature of the gearbox is possible in particular in the travelling situations with gearbox control actions by means of the temperature sensor arranged in the gearbox component.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Device for detecting the temperature of gearbox oil in a gearbox component of a vehicle automatic gearbox system, comprising:

a temperature sensor for providing first output signals indicative of the temperature of said gearbox oil;

a starter-interlock contact switch; and a gearbox control device connected to receive output signals of at least the temperature sensor and the starter-interlock contact switch; wherein the temperature sensor and the starter-interlock contact switch are coupled to a common signal line which is input to the gearbox control device;

and wherein in a first operating mode, said common signal line transmits said first output signals from the temperature sensor and in a second operating mode said common signal line transmits a signal indicative of a predetermined setting of the starter-interlock contact switch.

2. Device according to claim 1, wherein the temperature sensor is connected to the common signal line in series with the starter-interlock contact switch.

3. Device according to claim 2, wherein said starter-interlock contact switch interruptibly connects said temperature sensor to ground.

4. Device according to claim 1, wherein the temperature sensor is connected to the common signal line in parallel with the starter-interlock contact switch.

5. Device according to claim 4, wherein said starter-interlock contact switch interruptibly connects said temperature sensor to ground.

6. Device according to claim 1 wherein said signal indicative of a predetermined setting of the starter-interlock contact switch comprises the absence of a temperature signal from said temperature sensor.

7. Device according to claim 6, further comprising means for indirect determination of gearbox temperature based on a temperature of cooling water of an engine of said vehicle, an output from said means being transmitted via a connection line from an engine control device to the gearbox control device.

* * * * *